US007069209B2

(12) United States Patent
Chen et al.

(10) Patent No.: US 7,069,209 B2
(45) Date of Patent: Jun. 27, 2006

(54) TECHNIQUES FOR QUANTIZATION OF SPECTRAL DATA IN TRANSCODING

(75) Inventors: Wei-Ge Chen, Issaquah, WA (US); Ming-Chieh Lee, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 168 days.

(21) Appl. No.: 10/869,206

(22) Filed: Jun. 15, 2004

(65) Prior Publication Data

US 2004/0225506 A1 Nov. 11, 2004

Related U.S. Application Data

(60) Provisional application No. 09/894,901, filed on Jun. 28, 2001, now Pat. No. 6,757,648.

(51) Int. Cl.
*G10L 15/00* (2006.01)

(52) U.S. Cl. ........................ 704/219; 704/500; 341/111

(58) Field of Classification Search ................ 704/219, 704/500; 341/111

See application file for complete search history.

(56) References Cited

U.S. PATENT DOCUMENTS

| | | | | |
|---|---|---|---|---|
| 4,142,071 | A | 2/1979 | Croisier et al. | |
| 4,216,354 | A | 8/1980 | Esteban et al. | |
| 4,464,783 | A | 8/1984 | Beraud et al. | |
| 5,381,143 | A | 1/1995 | Shimoyoshi et al. | |
| 5,454,011 | A | 9/1995 | Shimoyoshi | |
| 5,617,142 | A * | 4/1997 | Hamilton | 375/240.03 |
| 5,623,424 | A | 4/1997 | Azadegan et al. | |
| 5,659,660 | A | 8/1997 | Plenge et al. | |
| 5,835,495 | A | 11/1998 | Ferriere | |
| 5,970,173 | A | 10/1999 | Lee et al. | |
| 6,044,089 | A | 3/2000 | Ferriere | |
| 6,370,502 | B1 | 4/2002 | Wu et al. | |
| 6,496,868 | B1 | 12/2002 | Krueger et al. | |
| 6,522,693 | B1 | 2/2003 | Lu et al. | |
| 6,650,705 | B1 | 11/2003 | Vetro et al. | |
| 6,678,654 | B1 | 1/2004 | Zinser, Jr. et al. | |

OTHER PUBLICATIONS

Acharya et al., "Compressed Domain Transcoding of MPEG," *Proc. IEEE Int'l Conf. of Multimedia Computing and Systems*, Austin, Texas, 20 pp. (Jun. 1998).

Amir et al., "An Application Level Video Gateway," *Proc. ACM Multimedia 95*, 10 pp. (Nov. 1995).

Assuncao et al., "A Frequency-Domain Video Transcoder for Dynamic Bit-Rate Reduction of MPEG-2 Bit Streams," *IEEE Transactions on Circuits and Systems for Video Technology*, vol. 8, No. 8, pp. 953-967 (Dec. 1998).

(Continued)

*Primary Examiner*—Daniel Abebe
(74) *Attorney, Agent, or Firm*—Klarquist Sparkman, LLP

(57) ABSTRACT

A transcoder reduces excess requantization error in quantization of spectral data. The transcoder phase shifts data decompressed by a decompressor. The phase shifting causes a change to corresponding spectral data produced in later transform coding of the decompressed data. When the spectral data is then quantized to reduce bitrate, the earlier phase shifting reduces excess requantization error. After transcoding, a second decompressor can compensate for the phase shifting by, for example, reverse shifting by the amount of the phase shift. Instead of phase shifting, the transcoder can reduce excess requantization error by, for example, adding random noise to the decompressed data or changing transform block sizes.

44 Claims, 5 Drawing Sheets

OTHER PUBLICATIONS

Assuncao et al., "Buffer Analysis and Control in CBR Video Transcoding," *IEEE Transactions on Circuits and Systems for Video Technology*, vol. 10, No. 1, pp. 83-92 (Feb. 2000).
Assuncao et al., "Transcoding of Single-Layer MPEG Video Into Lower Rates," *IEE Proc.-Vis. Image Signal Process.*, vol. 144, No. 6, pp. 377-383 (Dec. 1997).
Gibson et al., *Digital Compression for Multimedia*, "Chapter 4: Quantization," Morgan Kaufman Publishers, Inc., pp. 113-138 (1998).
Gibson et al., *Digital Compression for Multimedia*, "Chapter 7: Frequency Domain Coding," Morgan Kaufman Publishers, Inc., pp. 227-262 (1998).
Hamming, *Digital Filters*, Second Edition, "Chapter 2: The Frequency Approach," Prentice-Hall, Inc., pp. 19-31 (1977).
Keesman et al., "Transcoding of MPEG Bitstreams," *Signal Processing: Image Communication 8*, pp. 481-500 (1996).
Shanableh et al., "Heterogeneous Video Transcoding to Lower Spatio-Temporal Resolutions and Different Encoding Formats," *IEEE Transactions on Multimedia*, 31 pp. (Jun. 2000).
Shanableh et al., "Transcoding of Video Into Different Encoding Formats," *ICASSP-2000 Proceedings*, vol. IV of VI, pp. 1927-1930 (Jun. 2000).
Sun et al., "Architectures for MPEG Compressed Bitstream Scaling," *IEEE Transactions on Circuits and Systems for Video Technology*, vol. 6, No. 2, pp. 191-199 (Apr. 1996).
Tudor et al., "Real-Time Transcoding of MPEG-2 Video Bit Streams," *BBC R&D*, U.K., 6 pp. (1997).
Vishwanath et al., "A VLSI Architecture for Real-Time Hierarchical Encoding/Decoding of Video Using the Wavelet Transform," *Proc. ICASSP*, 5 pp. (1994).
Werner, "Generic Quantiser for Transcoding of Hybrid Video," *Proc. 1997 Picture Coding Symposium*, Berlin, Germany, 6 pp. (Sep. 1997).
Werner, "Requantization for Transcoding of MPEG-2 Intraframes," *IEEE Transactions on Image Processing*, vol. 8, No. 2, pp. 179-191 (Feb. 1999).
Youn et al., "Video Transcoder Architectures for Bit Rate Scaling of H.263 Bit Streams," *ACM Multimedia 1999*, Orlando, Florida, pp. 243-250 (1999).

* cited by examiner

Figure 1: Prior Art Transcoder
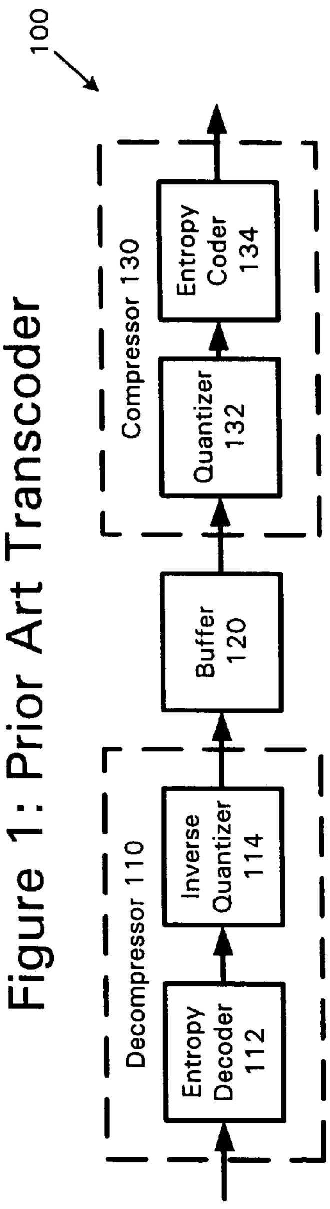
Figure 2: Excess Requantization Error With Prior Art Transcoder
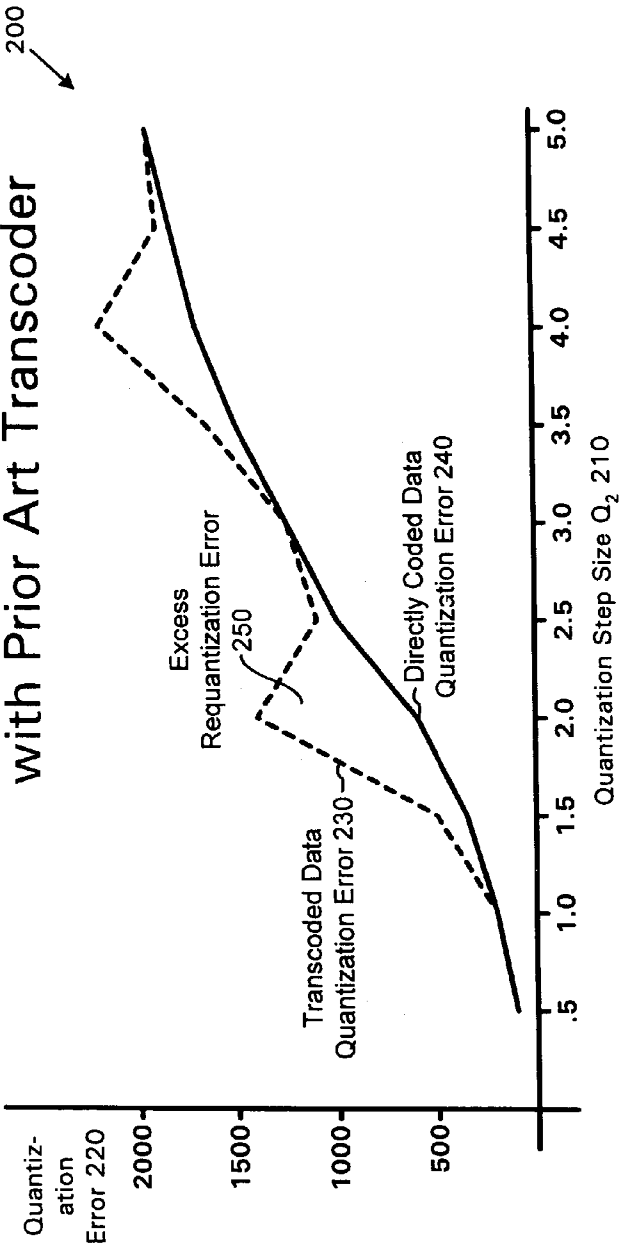

TECHNIQUES FOR QUANTIZATION OF SPECTRAL DATA IN TRANSCODING

CROSS REFERENCE TO RELATED APPLICATION

This is a continuation of U.S. patent application Ser. No. 09/894,901, filed Jun. 28, 2001 now U.S. Pat. No. 6,757,648, entitled "Techniques For Quantization Of Spectral Data In Transcoding," the disclosure of which is hereby incorporated by reference.

TECHNICAL FIELD

The present invention relates to quantization of spectral data in transcoding. In one embodiment, an audio transcoder phase shifts decompressed PCM audio data before transform coding and requantizing the data. The phase shifting reduces excess requantization error in the requantized data.

BACKGROUND

A computer processes audio or video information as a series of numbers representing samples of the audio or video information. For high quality audio or video, the computer represents a sample of information using a number with many possible values. The more values possible for the sample, the higher the quality because the number can capture more variations in sound or color. Table 1 shows ranges of possible values for several types of audio or video information of different quality levels, along with corresponding bitrate costs.

TABLE 1

Ranges of values and cost per value for different quality audio and video information

| Information type and quality | Number of possible values | Cost |
|---|---|---|
| audio sequence, voice quality | 0–255 per sample | 8 bits (1 byte) |
| audio sequence, CD quality | 0–65,535 per sample | 16 bits (2 bytes) |
| video image, black and white | 0–1 per pixel | 1 bit |
| video image, gray scale | 0–255 per pixel | 8 bits (1 byte) |
| video image, "true" color | 0–1 6,777,215 per pixel | 24 bits (3 bytes) |

As Table 1 shows, the cost of high quality audio and video information is high bitrate. High quality audio and video information consumes large amounts of computer storage and transmission capacity.

Compression (also called encoding or coding) decreases the cost of storing and transmitting audio and video information by converting the information into a lower bitrate form. Decompression (also called decoding) extracts a reconstructed version of the original information from the compressed form.

Quantization is a conventional compression technique. Quantization maps ranges of input values to single values. For example, a sample with a value anywhere between −1.5 and 1.499999 is mapped to 0, a sample with a value anywhere between 1.5 and 4.499999 is mapped to 1, etc To reconstruct the sample, the quantized value is multiplied by the quantization factor. After a value has been quantized, however, the original value cannot be precisely reconstructed. In essence, quantization decreases the quality of the signal in order to decrease the bitrate of the signal. Continuing the example started above, the quantized value 1 reconstructs to 1×3=3; it is impossible to determine where the original value was in the range 1.5 to 4.499999.

Several factors affect quantization. For a continuous, analog signal, a dynamic range sets the boundaries of the quantization. Suppose the range of an analog signal is infinite but most samples are close to zero. The dynamic range of the quantization focuses the quantization on the range most likely to yield real information, for example, around zero. For a signal already in numerical form, the dynamic range is bounded by the lowest and highest possible values.

Within the dynamic range, the number of quantization levels affects how closely the quantized signal tracks the input signal. For example, if a dynamic range has 64 quantization levels, each sample is assigned to one of 64 values. Increasing the number of quantization levels in the same dynamic range increases precision and decreases distortion, but also increases bitrate. Quantization step size Q is a related factor that measures the distance between reconstructed values.

There are many different kinds of quantization. In uniform, scalar quantization, each single sample in a signal is quantized by the same step size Q to produce a quantized value. For example, a uniform scalar quantizer maps a set of real numbers {u} into an integer set {−M/2, . . . ,−1,0, 1, . . . M/2}, where M is the dynamic range of the quantizer and Q is the real number quantization step size. The quantizer produces quantized output according to the following equation:

$$q(u) = \text{round}\left(\frac{\min(\max(u, -QM/2), QM/2)}{Q}\right), \quad (1)$$

where round is a function for rounding to the closest integer, and the min and max functions set a number outside of the dynamic range to a range boundary value. Other quantization formulas follow different conventions.

The difference between an input value for a sample and its reconstructed value is quantization error. If the input value falls within the dynamic range of the quantizer, quantization error for a sample is no more than Q/2. The larger the quantization step size Q, the greater the potential quantization error. The distortion D is a measure of quantization error for the entire signal, and can be calculated as the square of the differences between the original values and the reconstructed values.

$$D=(u-q(u)Q)^2 \quad (2).$$

Aside from uniform, scalar quantization, other quantization techniques include non-uniform quantization and vector quantization. Quantization can be non-adaptive or adaptive. For more information about quantization and the factors affecting the results of quantization, see Gibson et al., *Digital Compression for Multimedia*, "Chapter 4: Quantization," Morgan Kaufman Publishers, Inc., pp. 113–138 (1998).

Quantization helps a compressor reduce the bitrate of audio or video information at some cost to quality. The compressor can use various techniques to provide the best possible quality for a given bitrate, as measured by lowest objective or subjective distortion. These techniques include rate control, transform coding, and masking.

With rate control, a compressor adjusts quantization based upon a rate-distortion function that relates distortion (and hence quantization) to bitrate. The compressor dynamically adjusts quantization to utilize available bitrate.

Transform coding techniques convert data into a form that makes it easier to separate perceptually important information from perceptually unimportant information. The less important information can then be quantized heavily, while the more important information is largely preserved, so as to provide the best quality for a given bitrate. Transform coding techniques typically convert data to the frequency (or spectral) domain. For example, a transform coder converts a time series of audio samples into frequency coefficients, or, for video, transform coder converts pixel data into frequency coefficients. In the frequency domain, low frequency data has greater perceptual importance than high frequency data. Transform coding techniques include discrete cosine transform ("DCT"), modulated lapped transform ("MLT"), fourier transform, subband coding, and wavelets. In practice, input to transform coding techniques is partitioned into blocks, and each block is transform coded. Blocks may or may not overlap. For more information about transform coding, see Gibson et al., *Digital Compression for Multimedia*, "Chapter 7: Frequency Domain Coding," Morgan Kaufman Publishers, Inc., pp. 227–262 (1998).

Masking involves processing spectral data to emphasize perceptually important spectral data, and is typically done prior to quantization. This makes the perceptually important spectral data more robust to the subsequent quantization. Masking itself typically involves selective quantization, applying different levels of quantization to different ranges of spectral data, or can be performed as part of non-uniform or vector quantization.

Compression decreases the bitrate of audio and video information, which reduces storage and transmission costs. Different end users have different storage and transmission capacities, however, as well as different quality requirements. Thus, for example, a Web site operator would like to be able to stream an audio clip previously compressed to 128 kilobits/second ("Kb/s") to certain end users at 64 Kb/s. A particular end user might then recompress the 64 Kb/s audio clip to 32 Kb/s to save local storage space. In addition, different end users can require different compression formats.

Transcoding converts compressed data of one bitrate or format to compressed data of another bitrate (typically lower) or format. Different transcoders use different techniques.

Some transcoders fully decompress the compressed data and then fully recompress the data to the other bitrate or format. Other transcoders partially decompress the compressed data (converting only the decompressed portions) or convert the compressed data itself without decompression.

Heterogeneous transcoders use different formats for decompression and compression, for example, transcoding compressed MPEG 2 data to compressed H.261 data. Between decompression and compression, the data can be resampled or scaled into an acceptable input format for the compression. The resampling or scaling can require extensive processing, and can unnecessarily reduce quality. Moreover, this type of technique works when any of several available codecs can be used in a system, but is impractical or inconvenient for some real world applications. Homogeneous transcoders use the same format for decompression and compression.

For more information about different types of transcoding and transcoders, see Assuncao et al., "A Frequency-Domain Video Transcoder for Dynamic Bit-Rate Reduction of MPEG-2 Bit Streams", IEEE Transactions on Circuits and Systems for Video Technology, Vol. 8, No. 8, December 1998, pp. 953–967; Assuncao et al., "Buffer Analysis and Control in CBR Video Transcoding", IEEE Transactions on Circuits and Systems for Video Technology, Vol. 10, No. 1, February 2000, pp. 83–92; Werner, "Generic Quantiser for Transcoding of Hybrid Video," Proceedings of the 1997 Picture Coding Symposium, Berlin, Germany, September 1997; Tudor et al., "Real-Time Transcoding of MPEG-2 Video Bit Streams," Proceedings of the International Broadcast Convention, Amsterdam, September 1997; and Amir et al., "An Application Level Video Gateway," ACM Multimedia '95, November 1995.

FIG. 1 shows a generalized prior art transcoder (100) for transcoding audio data. The transcoder (100) is homogeneous—its decompressor (110) and compressor (130) work with the same compression format.

In the decompressor (110), an entropy decoder (112) decodes quantized transform coefficients for the audio data. An inverse quantizer (114) reconstructs the transform coefficients. A buffer (120) stores the reconstructed transform coefficients output by the decompressor (110), which are the input to the compressor (130). In the compressor (130), a quantizer (132) quantizes the reconstructed transform coefficients. To decrease bitrate, the quantizer (132) increases quanization. An entropy encoder (134) then entropy encodes the requantized transform coefficients.

The transcoder (100) can include an inverse transform coder in the decompressor (110) and a transform coder in the compressor (130), in which case the buffer (120) stores a reconstructed time series of audio data. This allows the transcoder (100) to use off-the-shelf decompressor and compressor products.

Because the transcoder (100) increases quantization, the transcoder (100) introduces additional distortion into the requantized data. In practice, the requantized data often has much more distortion than the original data directly quantized at the increased level of quantization. This is because, unlike compression of original data, transcoding involves requantization of data that has been quantized in a previous compression. The Assuncao and Werner papers listed above describe this effect in video data.

The maximum quantization error for a single value is $(Q_1+Q_2)/2$. The quantization error after the first quantization is at most $Q_1/2$, and the quantization error due to the second quantization is at most $Q_2/2$. The maximum $(Q_1+Q_2)/2$ is much greater than the maximum $Q_2/2$ because $Q_2$ is greaterthan $Q_1$ (so as to decrease bitrate) and $Q_1$ is significant to start with. For certain values of $Q_2$, however, the quantization error for transcoded data equals the quantization error for directly coded data.

FIG. 2 is a graph (200) showing quantization error of transcoded data for an audio clip (transcoded using the prior art transcoder (100) of FIG. 1) versus quantization error of directly coded data. The graph (200) measures quantization error (220) (summed for samples of the audio clip) as quantization step size $Q_2$ (210) increases. The input source has a Gaussian distribution, and is truncated to avoid overloading the quantizer.

The graph (200) plots transcoded data quantization error (230) for data previously quantized by $Q_1$=1.0 and then requantized by $Q_2$. The graph (200) also plots directly coded data quantization error (240) for data quantized by $Q_2$ without previous quantization by $Q_1$. The area between the transcoded data quantization error (230) and the direct-coded data quantization error (240) is excess requantization error (250).

The transcoded data quantization error (230) and the direct-coded data quantization error (240) are the same for certain integer multiples of $Q_1$ (e.g., $Q_2$=3.0), while for other integer multiples of $Q_1$ (e.g., $Q_2$=2.0) the transcoded data quantization error (230) is much greater than the direct-coded data quantization error (240).

Previous compression with $Q_1$ causes excess requantization error in transcoding. For example, consider the value 0.5631 transcoded and directly coded with different quantization step sizes as shown in Table 2.

TABLE 2

Transcoding versus direct coding of a value

| Sample | $Q_1$ | Reconstructed Value | $Q_2$ | Reconstructed Value | Error |
|---|---|---|---|---|---|
| .5631 | 1.0 | 1.0 | 2.0 | 2.0 | −1.4569 |
| .5631 | n/a | n/a | 2.0 | 0 | .5631 |
| .5631 | 1.0 | 1.0 | 3.0 | 0 | .5631 |
| .5631 | n/a | n/a | 3.0 | 0 | .5631 |

The quantization error when 0.5631 is directly coded with $Q_2$=3.0 is the same as the error when 0.5631 is transcoded with $Q_1$=1.0 and $Q_2$=3.0. This is because the quantization levels for $Q_1$=1.0, { . . . ,−1.5,−0.5,0.5,1.5, . . . }, overlap the levels for $Q_2$=3.0, { . . . ,−4.5,−1.5,1.5,4.5, . . . }.

In contrast, the quantization error when 0.5631 is directly coded with $Q_2$=2.0 is much smaller than the error when 0.5631 is transcoded with $Q_1$=1.0 and $Q_2$=2.0. This is because the quantization levels for $Q_1$=1.0 do not overlap the levels for $Q_2$=2.0, { . . . ,−3.0,−1.0,1.0,3.0, . . . }. As a result, rounding of some values by $Q_1$ changes the way $Q_2$ subsequently rounds those values, increasing quantization error for those values.

Excess requantization error is not a major concern if the first quantization step size is very small and thus introduces little distortion. If $Q_1$ introduces significant distortion, however, excess requantization error can become a problem. The problem of excess requantization error worsens as $Q_1$ increases, and transcoding becomes impractical. If the transcoder uses certain quantization step sizes, distortion dramatically increases. The transcoder cannot decrease bitrate gradually and gracefully.

The excess requantization error problem is exacerbated when the first stage quantization output is concentrated in a narrow range around 0. For such data, any increase in quantization step size causes an immediate and drastic increase in distortion. Maintaining the quantization step size, however, means maintaining the same bitrate. Audio transcoders can face an extreme example of this dilemma, in which the values of first stage quantization output for a frame are only −1, 0, or 1. Any increase to quantization step size silences the frame, making it impossible to decrease bitrate gradually and gracefully, but keeping the previous quantization step size results in the same bitrate.

SUMMARY

The present invention is directed to techniques for quantization of spectral data in transcoding. The techniques dramatically reduce excess requantization error in compressed data that is recompressed to a lower bitrate.

According to a first aspect of the present invention, a transcoder phase shifts data decompressed by a decompressor. The phase shifting causes a change to corresponding spectral data produced in later transform coding of the decompressed data. When the spectral data is then quantized to reduce bitrate, the earlier phase shifting reduces excess requantization error. For example, the transcoder phase shifts a time series of audio data by shifting the time series by one or more samples. Or, the transcoder phase shifts a block of spatial video data by adding or removing one or more rows or columns.

According to a second aspect of the present invention, after transcoding, a second decompressor compensates for phase shifting. For example, the second decompressor compensates by reverse shifting phase-shifted data by the amount of the phase shift. Or, the second decompressor compensates by shifting data that was previously shifted out back into the phase-shifted data.

According to a third aspect of the present invention, a transcoder reduces excess requantization error using a technique other than phase shifting. For example, the transcoder adds random noise to data decompressed by a decompressor. Or, the transcoder changes the sizes of blocks of data used in transform coding during recompression of the data.

Additional features and advantages of the invention will be made apparent from the following detailed description of an illustrative embodiment that proceeds with reference to the accompanying drawings.

BRIEF DESCRIPTION OF THE DRAWINGS

FIG. 1 is a block diagram showing a prior art audio transcoder.

FIG. 2 is a graph showing excess requantization error using the prior art audio transcoder of FIG. 1.

DETAILED DESCRIPTION

The illustrative embodiment of the present invention is directed to techniques for quantization of spectral data in transcoding. The techniques dramatically reduce excess requantization error in compressed data that is recompressed to a lower bitrate.

In the illustrative embodiment, a homogeneous transcoder includes a decompressor and a compressor. The decompressor decompresses data compressed to a first bitrate, and the compressor recompresses the data to a second, lower bitrate. Between the decompressor and the compressor, a phase shifter translates the data. For example, the phase shifter translates a time series of pulse code modulated ("PCM") audio data by one or more samples. Or, the phase shifter adds or removes one or more rows or columns to a prediction residual block of video data. Translation in the phase-shifted data causes a dramatic and immediate effect to corresponding spectral data output of a shift-variant transform coder. This change to the spectral data alleviates the problem of excess requantization error when the spectral data is quantized to decrease bitrate.

A second decompressor that receives the compressed data at the second, lower bitrate can also receive phase-shift-compensating data to compensate for the phase shift in playback. The second decompressor can compensate by reversing the phase shift translation to eliminate effects due to the translation (e.g., delay or jump ahead for audio data, spatial distortion for video or still image data). The second decompressor can also compensate by adding data that was shifted out back into the phase-shifted data before playback.

In alternative embodiments, the transcoder does not produce phase-shift-compensating data, is heterogeneous instead of homogeneous, uses a shift-invariant transform coder instead of a shift-variant transform coder, and/or uses partial decompression/recompression instead of full decompression/recompression.

In an alternative embodiment, instead of phase shifting, the transcoder changes the sizes of blocks of data that are transform coded. Changing block size affects the corresponding spectral data, which reduces excess requantization error in coarsened quantization.

In another alternative embodiment, instead of phase shifting, the transcoder adds random noise to the decompressed data so that the decompressed data has a probability density/distribution function ("pdf") similar to the pdf of the original data. The amount of noise added to the decompressed data depends on implementation, and involves a tradeoff between adding too much noise (creating perceptible distortion) and adding too little noise (failing to change the spectrum of spectral data and thereby reduce excess requantization error). Experiments show that at least $Q_1/2$ noise must be added on average to have the desired effect on the spectral data, but adding this amount of noise to the signal also introduces undesirable perceptual artifacts.

I. Computing Environment

Figure 3:
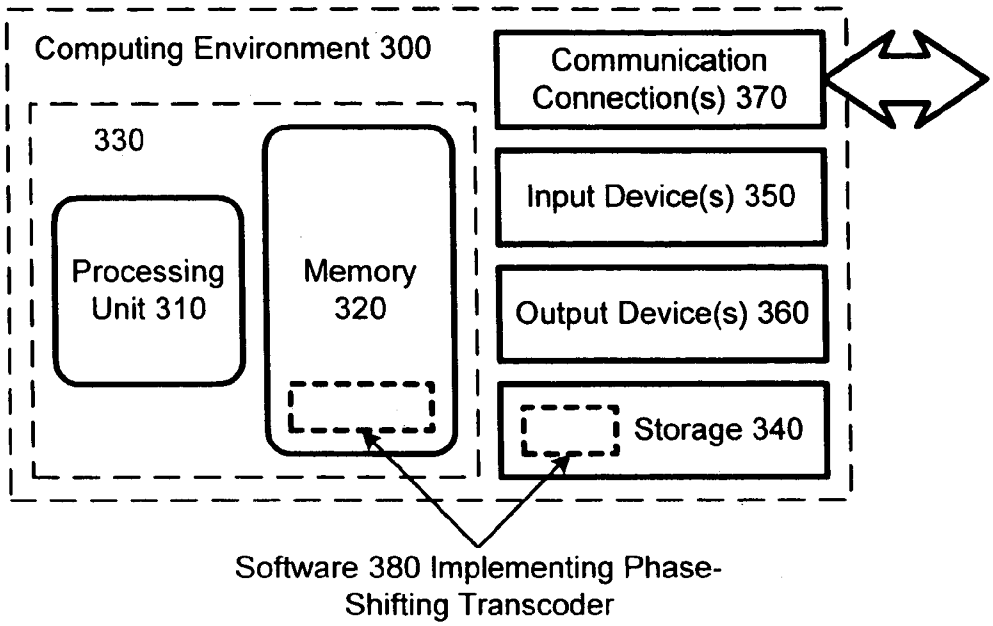
FIG. 3 is a block diagram of a suitable computing environment in which the illustrative embodiment may be implemented.

FIG. 3 illustrates a generalized example of a suitable computing environment (300) in which the illustrative embodiment may be implemented. The computing environment (300) is not intended to suggest any limitation as to scope of use or functionality of the invention, as the present invention may be implemented in diverse general-purpose or special-purpose computing environments.

With reference to FIG. 3, the computing environment (300) includes at least one processing unit (310) and memory (320). In FIG. 3, this most basic configuration (330) is included within a dashed line. The processing unit (310) executes computer-executable instructions and may be a real or a virtual processor. In a multi-processing system, multiple processing units execute computer-executable instructions to increase processing power. The memory (320) may be volatile memory (e.g., registers, cache, RAM), non-volatile memory (e.g., ROM, EEPROM, flash memory, etc.), or some combination of the two. The memory (320) stores software (380) implementing a phase-shifting transcoder.

A computing environment may have additional features. For example, the computing environment-(300) includes-storage-(340), one or more input devices (350), one or more output devices (260), and one or more communication connections (370). An interconnection mechanism (not shown) such as a bus, controller, or network interconnects the components of the computing environment (300). Typically, operating system software (not shown) provides an operating environment for other software executing in the computing environment (300), and coordinates activities of the components of the computing environment (300).

The storage (340) may be removable or non-removable, and includes magnetic disks, magnetic tapes or cassettes, CD-ROMs, DVDs, or any other medium which can be used to store information and which can be accessed within the computing environment (300). The storage (340) stores instructions for the software (380) implementing the phase-shifting transcoder.

The input device(s) (350) may be a touch input device such as a keyboard, mouse, pen, or trackball, a voice input device, a scanning device, or another device that provides input to the computing environment (300). For audio or video, the input device(s) (350) may be a sound card, video card, TV tuner card, or similar device that accepts audio or video input in analog or digital form. The output device(s) (360) may be a display, printer, speaker, or another device that provides output from the computing environment (300).

The communication connection(s) (370) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The invention can be described in the general context of computer-readable media. Computer-readable media are any available media that can be accessed within a computing environment. By way of example, and not limitation, with the computing environment (300), computer-readable media include memory (320), storage (340), communication media, and combinations of any of the above.

The invention can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "perform," "adjust," and "apply" to describe computer operations in a computing environment. These terms are high-level abstractions for operations performed by a computer, and should not be confused with acts performed by a human being. The actual computer operations corresponding to these terms vary depending on implementation.

II. Phase-Shifting Transcoders

Figure 4A:
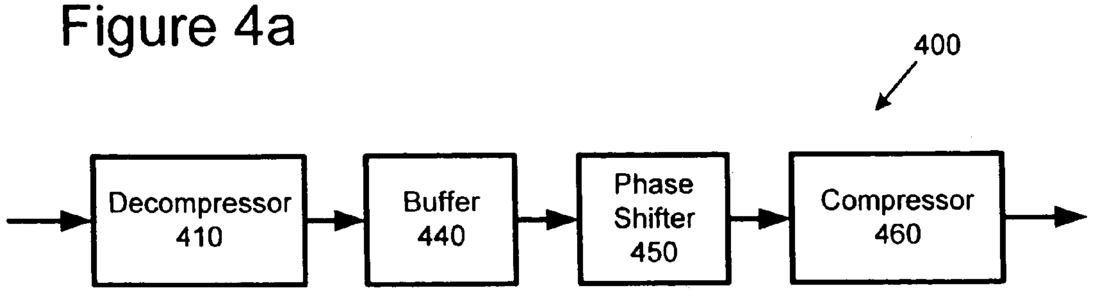
FIGS. 4*a* and 4*b* are block diagrams of phase-shifting transcoders according to the illustrative embodiment.
Figure 4B:
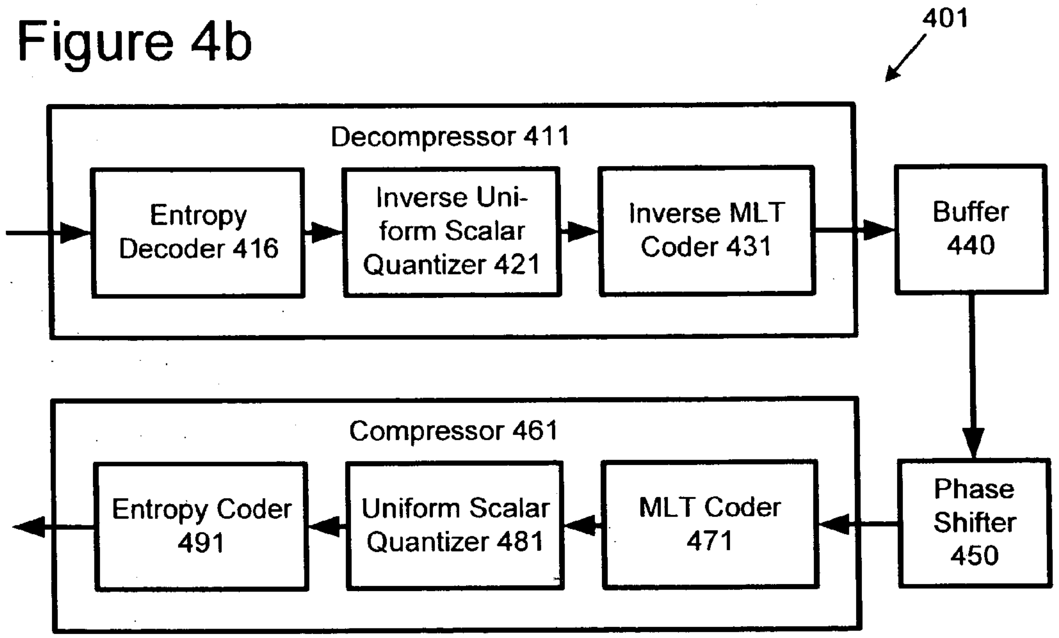

FIGS. 4*a* and 4*b* are block diagrams of phase-shifting transcoders (400, 401). The phase-shifting transcoders (400, 401) receive data compressed to a first bitrate, decompress the data, phase shift the decompressed data, and then recompress the data to a second bitrate lower than the first bitrate. The phase shifting reduces excess requantization error in the recompressed data.

FIG. 4*a* shows a generalized phase-shifting transcoder (400) for audio, video, still images, or other multimedia information. FIG. 4*b* shows a phase-shifting transcoder (401) for PCM audio data. Depending on implementation, components of the phase-shifting transcoders (400, 401) can be added, omitted, split into multiple components, combined with other components, or replaced with like components. In one embodiment, components of the phase-shifting audio transcoder (401) are provided with a perceptual audio codec. In alternative embodiments, transcoders with different components and/or other configurations of components perform phase shifting for transcoding.

A. Generalized Phase-Shifting Transcoder

With reference to FIG. 4*a*, the generalized phase-shifting transcoder (400) includes a decompressor (410), a buffer (440), a phase shifter (450), and a compressor (460).

The decompressor (410) receives compressed data for audio, video, a still image, or other multimedia. The components of the decompressor (460) vary by compression format and implementation, but include at least an inverse quantizer. The decompressor (410) fully decompresses the compressed data, for example, converting audio data to a time series of samples. Alternatively, the decompressor (410) partially decompresses the data, for example, decompressing pixel domain prediction residuals for video data, but not motion vector data.

The buffer (440) stores data output by the decompressor (410) and input to the compressor (460). The phase shifter (450) translates the phase of the data. For example, the phase shifter (450) translates a time series of audio samples forward or backward by some number of samples. Or, the phase shifter (450) adds one or more rows and/or columns to pixel domain video or still image data (e.g., prediction residual blocks or pixel blocks). The mechanics of the phase shifter (450) are described in the section entitled, "Phase Shifting." Although FIGS. 4*a* and 4*b* show the phase shifter (450) after the buffer (440), the positions of the buffer (440), the phase shifter (450), and one or more other buffers can vary depending on implementation. Data points phase shifted out of the data can be ignored or separately handled, for example, by separate compression, and later shifted back into the data in a second decompressor.

The compressor (460) recompresses the phase-shifted data. The components of the compressor (460) vary by compression format and implementation, but include at least a transform coder and a quantizer.

The transform coder converts phase-shifted data into spectral data. By shifting samples into and/or out of a block, phase shifting changes the constituents of the block, which can affect corresponding spectral data. The effect is more dramatic and immediate if the transform coder is shift-variant. In a shift-variant transform coder, translation of the data due to phase shifting affects corresponding spectral data. The effect of the translation depends on the initial phase of the signal itself, and can be viewed as random for the purposes of transcoding. To decrease the amount of phase shift needed to affect spectral data, and to keep as many data points as possible, the compressor (460) includes a shift-variant transform coder. For audio, the transform coder uses a MLT or other shift-variant transform. For block-based video/still images, the transform coder uses a DCT or other shift-variant transform. For more information about shift-invariance in transform coding, see Hamming, *Digital Filters*, 2nd edition, "Chapter 2: The Frequency Approach, 2.4: Invariance Under Translation," Prentice-Hall, Inc. (1983). In alternative embodiments, the transform coder uses a shift-invariant transform coder but increases the amount of phase shift.

The quantizer requantizes the output of the transform coder. The requantization is coarser than the quantization of the previous compression. Depending on implementation and compression format, the quantizer is a uniform scalar quantizer, non-uniform scalar quantizer, or vector quantizer, and can be adaptive or non-adaptive.

The decompressor (410) accepts compressed data in the same compression format that the compressor (460) outputs. For example, both are part of the same audio codec. Alternatively, the decompressor (410) and the compressor (460) work with different compression formats, and the phase shifter (450) guarantees that excess requantization error is reduced.

A decoding system (not shown) receives compressed data output by a phase-shifting transcoder (400, 401) and decompresses the data. The components of the decoding system vary by compression format and implementation, and generally perform the inverse of the operations performed by the compressor. The decoding system is not required to compensate for phase shifting applied to the data, but the decoding system can receive data allowing the decoding system to compensate for phase shifting. Such data can be an indicator of the amount of the phase shift and/or the actual data shifted out of a block or frame by phase shifting. After inverse transform coding, the decoding system compensates for phase shifting by reverse translating the phase-shifted data by the amount of the phase shift and/or adding the out-shifted data back into the phase-shifted data.

B. Phase-Shifting Audio Transcoder

With reference to FIG. 4*b*, the phase-shifting transcoder (401) for PCM audio data includes a decompressor (411), a buffer (440), a phase shifter (450), and a compressor (461). The PCM audio data is split into frames, and each frame is split into transform blocks to facilitate transform coding. In one embodiment, the blocks have variable size to allow variable resolution representation of the PCM audio data. For example, small blocks allow for greater preservation of perceptually important detail at transition regions in the PCM audio data.

The decompressor (411) receives compressed PCM audio data with a first bitrate. The decompressor (411) includes an entropy decoder (416), an inverse uniform scalar quantizer (421), and an inverse MLT coder (431). The entropy decoder (415) decodes the compressed PCM audio data. For example, the entropy decoder (415) uses Huffman decoding, run length decoding, dictionary decoding, arithmetic decoding, LZ decoding, a combination of the above, or some other entropy decoding technique. For each decoded block, the inverse uniform scalar quantizer (421) reconstructs a block of quantized transform coefficients using the quantization step size of the previous compression. The inverse MLT coder (431) then converts the block of reconstructed-transform coefficients into a block of PCM audio data.

The buffer (440) stores the decompressed PCM audio data, and the phase shifter (450) translates the PCM audio data forward or backward by some number of samples.

The compressor (461) recompresses the phase-shifted PCM audio data. The compressor (461) includes a MLT coder (471), a uniform scalar quantizer (481), and an entropy encoder (491). The MLT coder (471) converts blocks of phase-shifted PCM audio data to blocks of transform coefficients. The MLT coder (471) accepts blocks of different sizes. The uniform scalar quantizer (481) quantizes the blocks of transform coefficients using an increased quantization step size (greater than the quantization step size used in the previous compression). The uniform scalar quantizer (481) can be part of a rate control system that reacts to buffer fullness in the compressor (461) or some other bitrate indicator. The entropy encoder (491) entropy codes the quantized blocks of transform coefficients. For example, the entropy encoder (491) uses Huffman coding, run length coding, dictionary coding, arithmetic coding, LZ coding, a combination of the above, or some other entropy coding technique.

C. Phase-Shifting Video Transcoder

A phase-shifting video transcoder (not shown) includes components for a video decompressor and compressor. The video decompressor typically includes an entropy decoder, an inverse quantizer, and an inverse frequency transformer. If the previous compression used motion estimation, the decompressor can include a motion compensator. The transcoder's video compressor typically includes a frequency transformer, a quantizer, and an entropy coder. If the second compression uses motion estimation, the compressor includes a motion estimator as well as decompression components for calculating reference frames during the second compression.

If the transcoder's video compressor uses motion estimation, the transcoder can perform phase shifting on blocks of pixel domain prediction residuals. The phase-shifted residuals can then influence motion estimation in the compressor if the video is fully decompressed. Alternatively, the motion vector data from the previous compression can be left unchanged or be changed without full decompression and recalculation of motion vector data. If the transcoder's video compressor does not use motion estimation, the transcoder can perform phase shifting on decompressed blocks of pixels.

A phase-shifting still image transcoder (not shown) includes components for an image decompressor and compressor. The components are analogous to those of a phase-shifting video transcoder without motion estimation/compensation. The transcoder performs phase shifting on decompressed pixel domain data.

III. Phase Shifting

Figure 5:
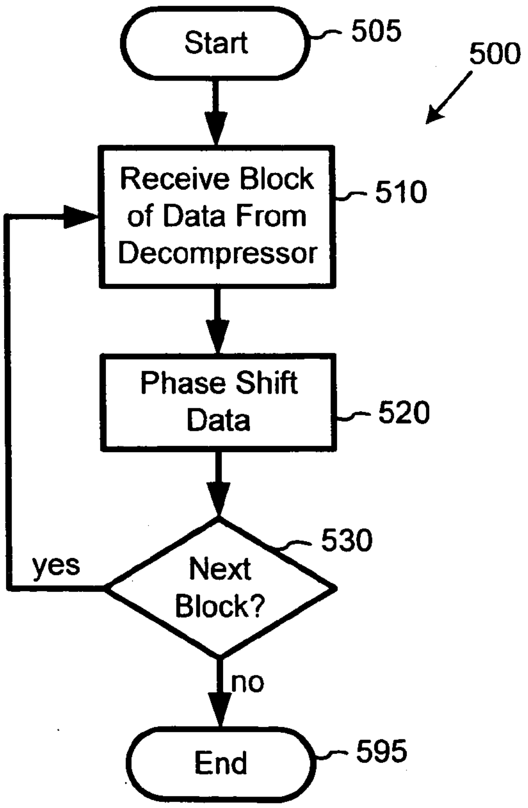
FIG. 5 is a flowchart showing a technique for phase shifting data for transcoding according to the illustrative embodiment.

FIG. 5 is a flowchart showing a technique (500) for phase shifting data for transcoding. A transcoder, such as the one shown in FIG. 4*a* or 4*b*, performs the phase shifting technique (500).

After the start (505), the transcoder receives (510) a block of data from a decompressor, for example, a block of reconstructed PCM audio data placed in a buffer by the decompressor. The transcoder phase shifts (520) the data, which translates the data. The phase shift causes a change to a corresponding block of spectral data in subsequent transform coding, thereby reducing excess requantization error in subsequent quantization. The actual operations of the phase shifting depend on the type of data. FIGS. 6*a* to 6*c* and 7*a* and 7*b* are diagrams showing different phase shifting translations for audio and video/still images. The transcoder determines (530) if another block of data is to be phase shifted for transcoding. If so, the transcoder receives (510) the next block of data. If not, the transcoder ends (595) the phase shifting technique (500).

A. Phase Shifting Audio Data

Figure 6A:
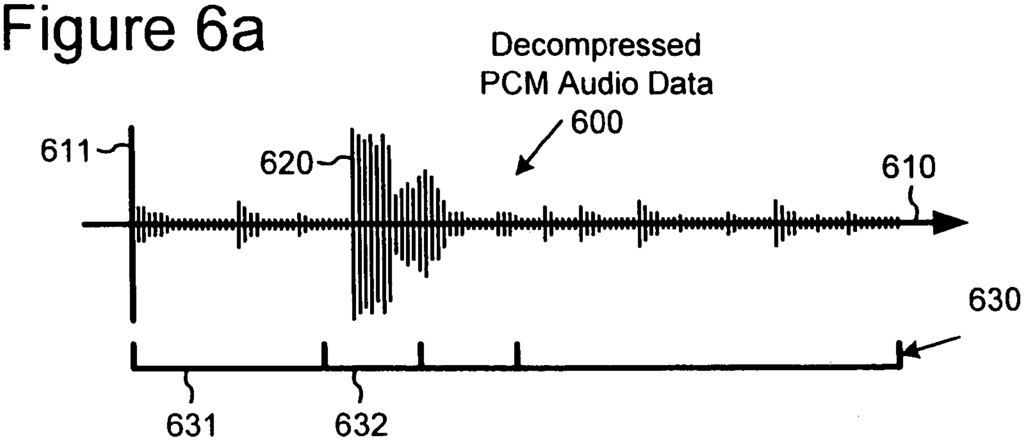
FIGS. 6*a*–6*c* are diagrams showing phase shifting translations for audio transcoding according to the illustrative embodiment
Figure 6B:
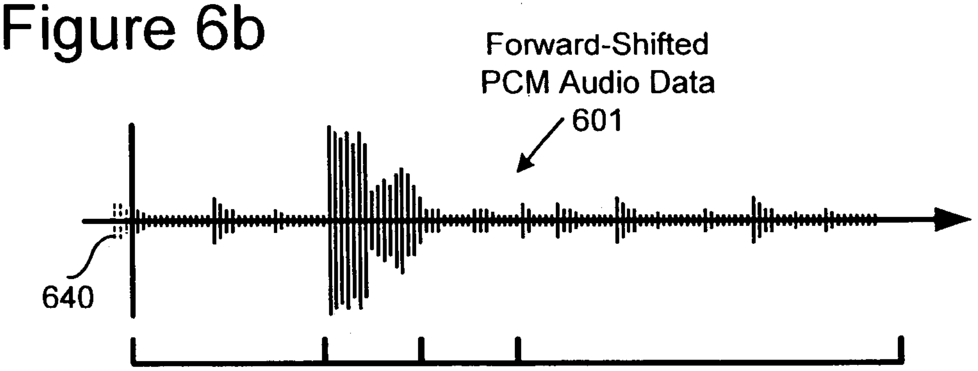
Figure 6C:
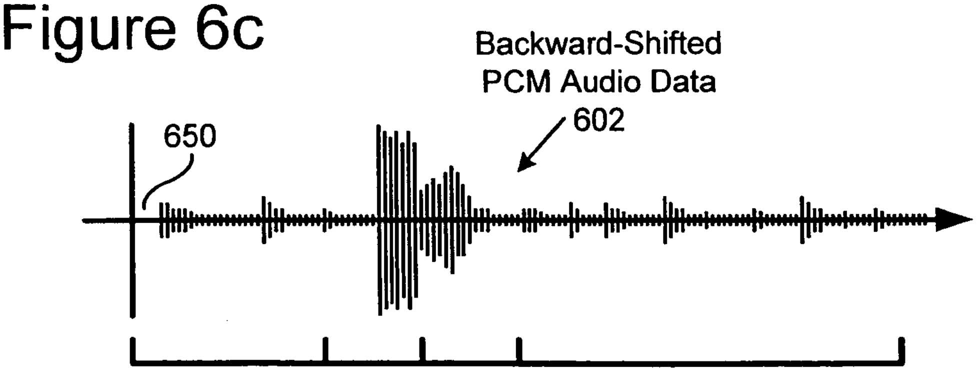

FIGS. 6*a*–6*c* illustrate phase shifting for a time series of PCM audio data. In FIG. 6*a*, a time series (600) of decompressed PCM audio data includes samples (620) of PCM audio data oriented along a time axis (610). The samples (620) are partitioned into variable-sized transform blocks (630) for transform coding. For periods of transition in the time series (600), smaller transform blocks (632) help preserve transition detail through subsequent quantization. For periods with relatively constant samples, larger transform blocks (631) help reduce overall bitrate without drastically affecting perceptual quality.

Relative to a point (611) in time, the transcoder shifts the time series forward or backward by a number of samples. Forward shifting introduces a slight jump ahead in playback, while backward shifting introduces slight delay. The amount of shift depends on implementation, and can be any integer or non-integer number of samples. The amount of shift can vary in magnitude and/or direction, according to a pattern or without a pattern, from block to block or between other size sections of data. The amount of shift should be enough to change the spectrum of the data in transform coding, but not so much as to cause noticeable delay or accelaration in playback. For 44 KHz PCM audio data and a shift-variant, MLT transform coder, experiments indicate that phase shift of four or eight samples drastically reduces excess requantization error while introducing an imperceptible delay or jump ahead. For audio, sampling rate is typically several orders of magnitude larger than the amount of phase shift, so the delay or jump ahead is not likely to be significant. Even so, the transcoder can send a phase shift indicator for a decompressor to use to compensate for the phase shift.

FIG. 6*b* shows a forward-shifted time series (601) of PCM audio data for which the transcoder translates the input time series (600) four samples (640) ahead, introducing a slight jump ahead in playback. The amount of shift can ripple through the time series (601), so the first four samples of the second block shift to the first block, the first four samples of the third block shift to the second block, etc. Alternatively, each block of samples can be separately shifted. Any empty space in a block created by the phase shifting can be padded with null values, the last valid value of the block, or some other pattern of values. The size of the transform blocks (630) is much greater than the phase shift amount, so the effect of the phase shifting on the information content of variable-size transform blocks (630) is negligible.

The out-shifted samples (640) can be ignored, sent as literals, or compressed separately. The loss of the out-shifted samples (640) is not likely to be noticed. If the transcoder separately handles the out-shifted samples (640), however, a decompressor can later decompress the out-shifted samples (640) as appropriate and shift them back into the time series.

FIG. 6*c* also shows a backward-shifted time series (602) of PCM audio data for which the transcoder translates the input time series (600) four samples (640) backward, introducing slight delay in playback. Again, the amount of shift can ripple through the time series (602) or each block can be shifted separately. The empty space (650) created by the shifting can be padded with null values, the first valid value, or some other pattern of values. Any samples shifted out of the time series can be ignored, sent as literals, or compressed separately.

Although FIGS. 6*b* and 6*c* show phase shifting occuring at the front of blocks, phase shifting could occur in other ways (e.g., from the back of blocks). In an alternative embodiment, instead of phase shifting data, a transcoder changes the spectrum of spectral data by changing the transform block sizes. For example, the transcoder decreases the size of transform blocks by small increments and/or separately codes any samples removed from transform blocks. In practice, transform block sizes are typically in powers of 2 (i.e., 128 samples, 256 samples, 512 samples, etc.) to simplify transform coding. This constraint complicates the block resizing approach because blocks cannot be resized in small increments. Working with the available set of transform block sizes, splitting a block increases the complexity (and potentially the bitrate) of compression, and merging blocks decreases temporal resolution of the output.

B. Phase Shifting Video or Still Image Data

Figure 7A:
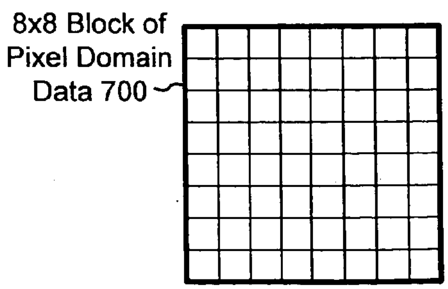
FIGS. 7*a* and 7*b* are diagrams showing phase shifting translations for video or still image transcoding according to the illustrative embodiment.
Figure 7B:
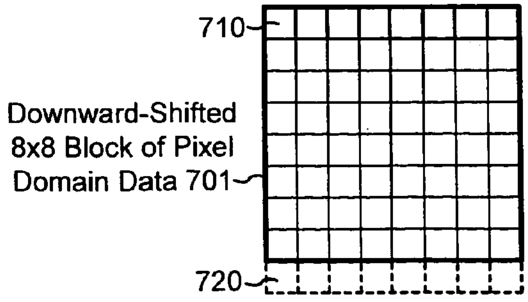

FIGS. 7*a* and 7*b* illustrate phase shifting for video or still image data. In FIGS. 7*a* and 7*b*, the data is a block of pixel domain data. The pixel domain data can be pixel data for a video frame/still image or a prediction residual for a motion estimated block of a predicted video frame.

With reference to FIG. 7*a*, the transcoder shifts the block (700) by some number of rows and/or columns of pixels. Shifting in any direction introduces a slight spatial distortion in the reconstructed data. The amount of shift depends on implementation, and can be any integer or non-integer number of pixels. The amount of shift can vary in magnitude and/or direction, according to a pattern or without a pattern, from block to block or between other size sections of data. The amount of shift should be enough to change the corresponding spectral data for the block, but not so much as to cause noticeable spatial distortion in playback. The transcoder can send a phase shift indicator for a decompressor to use to compensate for the shift.

FIG. 7*b* shows a downward-shifted block (701) of pixel domain data for which the transcoder translates the block (700) downward by one row (710). If the block includes raw pixel data for a frame, the amount of shift can ripple through the frame. The added row (710) can be padded with null values, values from the row beneath, or some other pattern of values. The out-shifted row (720) of pixel domain data can be ignored, sent as literals, or compressed separately. If the transcoder separately handles the out-shifted row (720), a decompressor can later decompress the row (720) as appropriate and shift the row (720) back into the block.

Although FIG. 7*b* shows downward shifting of the block, upward, leftward, or rightward shifting is also possible. Moreover, although FIGS. 7*a* and 7*b* show 8×8 blocks of pixel domain data, the size of the blocks depends on implementation. Phase shifting can also be applied to non-block-based video/still image transcoding.

In an alternative embodiment, instead of phase shifting spatial data for a block, a transcoder changes corresponding spectral data by changing the block sizes in transform coding. Again, however, block-based transform coders typically accept blocks of pre-determined, fixed size.

IV. Results

Figure 8A:
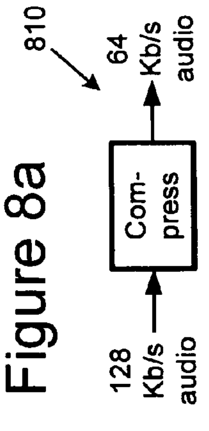
FIG. 8*a*–8*c* are block diagrams of, and FIGS. 8*d*–8*f* are waveform graphs showing results of, directly coding a test audio file to 64 Kb/s, brute-force transcoding the file from 128 KB/s to 64 KB/s, and phase-shift transcoding the file from from 128 KB/s to 64 KB/s.
Figure 8D:
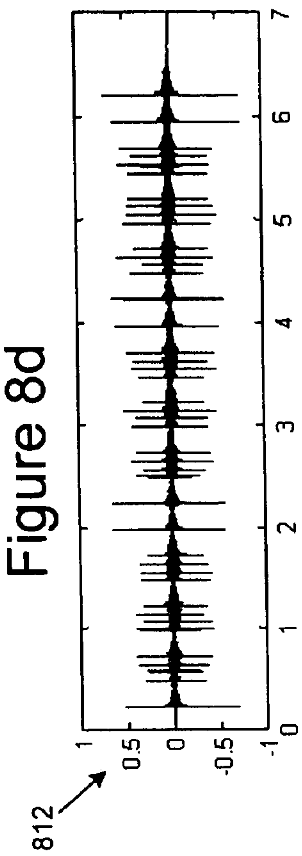
Figure 8B:
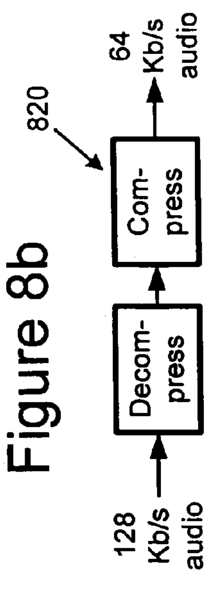
Figure 8E:
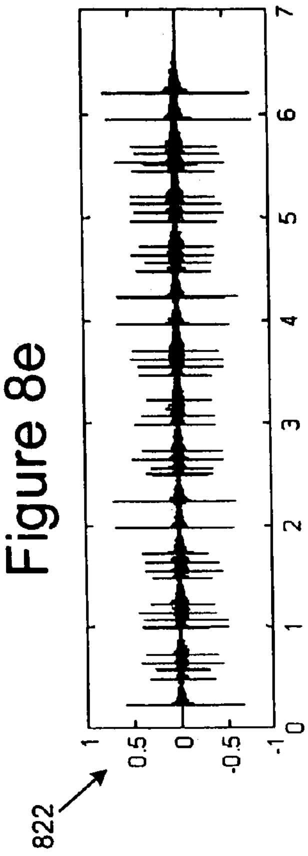
Figure 8C:
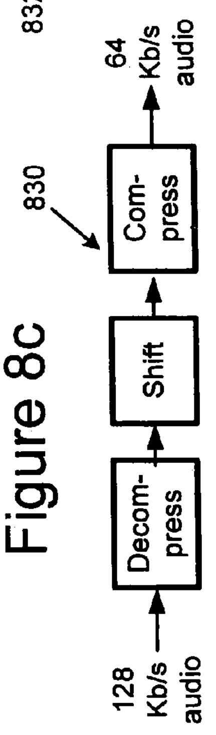
Figure 8F:
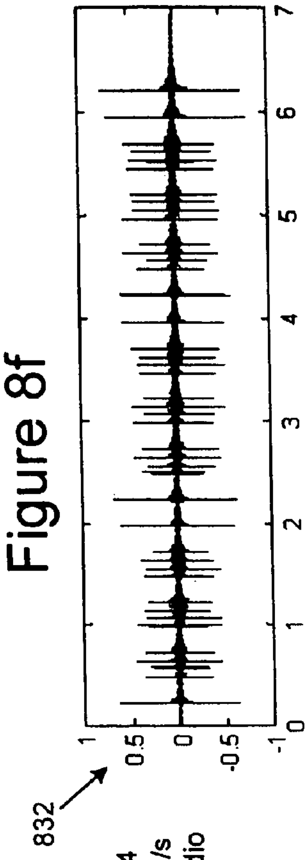

FIGS. 8*a*–8*c* are block diagrams of directly coding, brute-force transcoding, and phase-shift transcoding a test audio file to a bitrate of 64 Kb/s. The test audio file is entitled, "Castanet," and is a well-known test file for audio compression at 128 Kb/s and 64 Kb/s. FIGS. 8*d*–8*f* are waveform graphs showing the results of the coding shown in FIGS. 8*a*–8*c*, respectively.

FIG. 8*a* is a block diagram of direct coding (810) of the original, uncompressed test file to 64 Kb/s. FIG. 8*d* shows the corresponding waveform (812), as reconstructed from the 64 Kb/s compressed version. FIGS. 8*a* and 8*d* serve as the hypothetical best case for compression of the test file to 64 Kb/s.

FIG. 8*b* is a block diagram showing brute-force transcoding (820) of a 128 Kb/s version of the test file to 64 Kb/s. FIG. 8*e* shows the corresponding waveform (822), as reconstructed from the 64 Kb/s compressed version. Compared to the best case waveform (812), the brute-force transcoding waveform (822) shows severe distortion around 3.2 seconds, where a signal peak has been completely silenced. In addition to this dramatic distortion, the reconstructed 64 Kb/s file from the brute-force transcoding includes numerous unpleasant audible distortions that do not show up in the waveform (822).

FIG. 8*c* is a block diagram (830) showing phase-shift transcoding of a 128 Kb/s version of the test file to 64 Kb/s. FIG. 8*f* shows the corresponding waveform (832), as reconstructed from the 64 Kb/s compressed version. The phase-shift transcoding waveform (832) looks almost the same as the best case waveform (812), and the reconstructed 64 Kb/s file from the phase-shift transcoding includes fewer audible distortions than the reconstructed 64 Kb/s file from the brute-force transcoding.

Having described and illustrated the principles of our invention with reference to an illustrative embodiment, it will be recognized that the illustrative embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the illustrative embodiment shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A system for processing information by performing a method comprising:

receiving information that has been decompressed after a first compression, the first compression including a first quantization; and phase-shifting the received information to alter spectral information produced by transform coding the phase-shifted information in a second compression, thereby reducing requantization error associated with a second quantization in the second compression.

2. The system of claim 1 wherein the method further comprises:

receiving compressed information from an optical medium or magnetic medium; and decompressing the compressed information to produce the decompressed information.

3. The system of claim 2 wherein the decompressing comprises entropy decoding, inverse quantization, and inverse transform coding, and wherein the second compression includes the transform coding, the second quantization, and entropy coding.

4. The system of claim 1 wherein the transform coding in the second compression uses a shift-variant transform.

5. The system of claim 1 wherein the phase-shifting shifts by a first amount if the transform coding in the second compression uses a shift-variant transform, and wherein the phase-shifting shifts by a second amount greater than the first amount if the transform coding in the second compression uses a shift-invariant transform.

6. The system of claim 1 wherein the second quantization is coarser than the first quantization.

7. The system of claim 1 wherein the method further comprises:

performing the second compression on the phase-shifted information, thereby producing recompressed information; and outputting the recompressed information as a modulated data signal on a RF carrier or to an optical or magnetic medium.

8. A medium storing the recompressed information of claim 7.

9. The system of claim 1 wherein the information is audio.

10. The system of claim 1 wherein the information is video.

11. The system of claim 1 wherein the first compression and the second compression use the same compression format.

12. The system of claim 1 wherein the first compression and the second compression use different compression formats.

13. The system of claim 1 wherein the system includes phase-shifting transcoding software running in a general-purpose computing environment.

14. The system of claim 1 wherein the system includes special-purpose phase-shifting transcoding hardware in a computing environment.

15. The system of claim 1 wherein the phase-shifting includes shifting by a variable number of values.

16. The system of claim 1 wherein the direction of the shifting is variable.

17. The system of claim 1 wherein the phase-shift ripples through plural blocks of the information such that values shifted out of one of the plural blocks are shifted into another of the plural blocks.

18. The system of claim 1 wherein the method further comprises outputting out-shifted values of the information for subsequent in-shifting during reconstruction.

19. The system of claim 1 wherein the method further comprises padding empty values created by the phase-shifting with null values or a repeated end value.

20. A system for processing information by performing a method comprising:

receiving information that has been decompressed after a first compression, the first compression including a first quantization; and adding random noise to the received information to alter spectral information produced by transform coding in a second compression, thereby reducing requantization error associated with a second quantization in the second compression.

21. The system of claim 20 wherein adding the random noise makes the probability distribution function of the received information closer to that of the information in original form.

22. The system of claim 20 wherein the amount of added random noise varies depending on the degree of the first quantization.

23. The system of claim 20 wherein the method further comprises:

receiving compressed information from an optical medium or magnetic medium;

decompressing the compressed information to produce the decompressed information;

performing the second compression on the information with the added random noise, thereby producing recompressed information; and outputting the recompressed information as a modulated data signal on a RF carrier or to an optical or magnetic medium.

24. A medium storing the recompressed information of claim 23.

25. The system of claim 23 wherein the decompressing comprises entropy decoding, inverse quantization, and inverse transform coding, and wherein the second compression includes the transform coding, the second quantization, and entropy coding.

26. The system of claim 20 wherein the information is audio.

27. The system of claim 20 wherein the information is video.

28. The system of claim 20 wherein the first compression and the second compression use the same compression format.

29. A system for processing information by performing a method comprising:

receiving information that has been decompressed after a first compression, the first compression including a first quantization; and changing transform block size of one or more of plural blocks of the received information to alter spectral information produced by transform coding in a second compression, thereby reducing requantization error associated with a second quantization in the second compression.

30. The system of claim 29 wherein the method further comprises:

receiving compressed information from an optical medium or magnetic medium;

decompressing the compressed information to produce the decompressed information;

performing the second compression on the information with the changed transform block sizes, thereby producing recompressed information; and outputting the recompressed information as a modulated data signal on a RE carrier or to an optical or magnetic medium.

31. A medium storing the recompressed information of claim 30.

32. The system of claim 30 wherein the decompressing comprises entropy decoding, inverse quantization, and inverse transform coding, and wherein the second compression includes the transform coding, the second quantization, and entropy coding.

33. The system of claim 29 wherein the information is audio.

34. The system of claim 29 wherein the information is video.

35. The system of claim 29 wherein the first compression and the second compression use the same compression format.

36. A method comprising:

receiving compressed information that has been compressed in a first compression including a first quantization;

decompressing the compressed information to produce decompressed information;

phase-shifting the decompressed information to alter spectral information produced by transform coding the phase-shifted information in a second compression, thereby reducing requantization error associated with a second quantization in the second compression;

performing the second compression on the phase-shifted information, thereby producing recompressed information; and outputting the recompressed information.

37. The method of claim 36 wherein the compressed information is received from an optical medium or magnetic medium, and wherein the recompressed information is output as a modulated data signal on a RE carrier or to an optical or magnetic medium.

38. The method of claim 36 further comprising adjusting the amount of the phase-shifting to produce an acceptable degree of change in the spectral information while introducing an acceptable amount of shifting.

39. The method of claim 36 wherein the phase-shifting shifts by a first amount if the transform coding uses a shift-variant transform, and wherein the phase-shifting shifts by a second amount greater than the first amount if the transform coding uses a shift-invariant transform.

40. The method of claim 36 wherein the first compression and the second compression use the same compression format.

41. The method of claim 36 wherein the phase-shift ripples through plural blocks of the information such that values shifted out of one of the plural blocks are shifted into another of the plural blocks.

42. The method of claim 36 further comprising padding empty values created by the phase-shifting with null values, a repeated end value, or other values.

43. A computer-readable medium storing computer-executable instructions for causing a computer system programmed thereby to perform the method of claim 36.

44. A medium storing the recompressed information of claim 36.

* * * * *